(12) United States Patent
Beer (10) Patent No.: US 10,647,514 B2
(45) Date of Patent: May 12, 2020

(54) TRANSPORT ROBOT WITH LONGITUDINAL CONVEYOR

(71) Applicant: SERVUS Intralogistics GmbH, Dornbirn (AT)

(72) Inventor: Christian Beer, Schwarzach (AT)

(73) Assignee: Heron Innovations Factory GmbH, Dornbirn (AT)

( * ) Notice: Subject to any disclaimer, the term of this patent is extended or adjusted under 35 U.S.C. 154(b) by 0 days.

(21) Appl. No.: 14/325,986

(22) Filed: Jul. 8, 2014

(65) Prior Publication Data
US 2015/0023772 A1  Jan. 22, 2015

(30) Foreign Application Priority Data

Jul. 16, 2013  (DE) .................. 10 2013 011 860

(51) Int. Cl.
*B66F 9/14* (2006.01)
*B65G 17/32* (2006.01)
*B65G 1/04* (2006.01)
*B65G 1/06* (2006.01)

(52) U.S. Cl.
CPC ......... *B65G 17/323* (2013.01); *B65G 1/0407* (2013.01); *B65G 1/0492* (2013.01); *B65G 1/065* (2013.01); *B66F 9/141* (2013.01); *B65G 1/0435* (2013.01)

(58) Field of Classification Search
CPC .............................. B66F 9/141; B65G 1/0407
See application file for complete search history.

(56) References Cited

U.S. PATENT DOCUMENTS

| | | | | |
|---|---|---|---|---|
| 4,453,874 A | * | 6/1984 | Veldhuizen | B65G 59/023 414/659 |
| 5,238,350 A | * | 8/1993 | Krieg | B65G 1/0435 414/278 |
| 2004/0126210 A1 | * | 7/2004 | Hansl | B65G 1/0407 414/281 |
| 2006/0285947 A1 | * | 12/2006 | Hansl | B65G 1/0407 414/277 |
| 2007/0134077 A1 | | 6/2007 | Laurin et al. | |
| 2008/0283364 A1 | | 11/2008 | Laganiere | |

(Continued)

FOREIGN PATENT DOCUMENTS

| | | | | |
|---|---|---|---|---|
| DE | 2631942 A | * | 2/1977 | ........... B65G 59/023 |
| DE | 20012197 | | 1/2001 | |

(Continued)

*Primary Examiner* — Gerald McClain
(74) *Attorney, Agent, or Firm* — Faegre Drinker Biddle & Reath LLP (57) ABSTRACT

A transport robot having a loading device (16-19) and loading arms for loading and unloading items to be transported (13) on the transport robot, wherein the item to be transported (13) is stored in a high-bay storage shelving (12) at the side of the direction of travel for the transport robot, and the loading device (16-19) is driven in a displaceable manner, and can be guided over at least one of the two sides of the outer contour of the transport robot, and can be brought into contact with the item to be transported (13), wherein the loading device (16-19) is formed by at least one loading arm (7, 8; 17, 18), designed as a longitudinal conveyor (6) for gripping under the bottom surface of the item to be transported (13).

17 Claims, 9 Drawing Sheets

(56) References Cited

U.S. PATENT DOCUMENTS

2010/0057246 A1* 3/2010 Hansl .................. B65G 1/0407
                                                        414/796.2
2011/0008138 A1    1/2011 Yamashita

FOREIGN PATENT DOCUMENTS

| DE | 20210214 | 1/2003 |
| DE | 4205856 | 4/2006 |
| EP | 0462518 | 9/1995 |
| JP | 859138512 | 8/1984 |
| WO | 1994/004447 | 3/1994 |
| WO | 2005/000718 | 1/2005 |
| WO | 2012/088226 | 6/2012 |

* cited by examiner

TRANSPORT ROBOT WITH LONGITUDINAL CONVEYOR

The invention relates to a transport robot having a drive for a loading device according to the preamble of claim 1.

A transport robot with a loading device for items to be transported is known, for example, from the subject matter of US 2011/0008138 A1. The transport robot shown there is supported by guide rails and support rollers on the profiles of a rail system, can be automatically driven on this rail system, and is controlled by an external control unit.

In order to receive items to be transported that are stored in high-bay storage shelving from the side, a loading device is disposed on this known transport robot, consisting of telescoping and displaceable loading arms. Each loading arm is driven such that it can be displaced in relation to the other loading arm, such that a telescoping action of the loading arm is obtained.

The telescoping, extendable loading arms pass laterally along the load that is to be received, and a pivotable pawl is disposed on the lower surface of the front and outermost loading arm, which rests against the back surface of the item. The disadvantage with this configuration is that the item cannot be gripped at its undersurface, but instead, can only be gripped at the back, wherein access along the lateral surfaces results. The items to be transported are pulled onto the surface of the transport robot by means of the pawls that have been pivoted outward, which are disposed on the ends of the telescopic arms.

As a result, however, there is the disadvantage that the width of the items to be transported must be adapted to the width of the telescopic loading device, and that arbitrarily smaller or larger pieces in the items to be transported cannot be pulled onto the transport robot.

A further disadvantage is that a certain height of the items to be transported is required, because with shorter items to be transported, the pawls are no longer capable of gripping the back of the items to be transported, and pulling said items onto the transport robot.

Moreover, it is necessary that with items to be transported disposed behind one another in a high-bay storage shelving, a certain spacing between the back edge of the first items to be transported and the front edge of the subsequent items to be transported must be provided, in order for the pawls on the loading device to be able to be placed in position, and to be able to reach into this space, and to pull out the respective foremost items to be transported.

The telescopic displacement drive for the loading arms is relatively complex in its construction, and substantially consists of a continuous toothed belt, which encompasses all of the extendable telescopic arms in order to thus ensure a controlled displacement of the interconnected telescopic arms.

It is known from the subject matter of DE 29 27 692 A1 that a loading device can be formed that can be driven along a roller track, by means of which it is possible to reach beneath an item that is to be received by means of a loading arm, and a pawl formed on the free end of the loading arm that can be pivoted in a horizontal plane. However, this document has the disadvantage that a transport robot is not specified.

As a prerequisite, a space must be provided between the back edge of the foremost items to be transported and the front edge of the subsequent items to be transported, because it must be possible to reach into the space between the back surface of the foremost items to be transported and the front surface of the items to be transported behind it by means of the pawl, which can be pivoted in the horizontal axis, and raised and lowered in the vertical axis.

As a result, there are limitations with respect to the arrangement and dimensions of items to be transported.

A storage area consisting of a roller track, according to the subject matter of DE 29 27 692 A1, is particularly expensive, because a roller track of this type must be allocated to each storage area, resulting in disproportionately high costs for storage shelving having a total of 10,000 storage spaces and suchlike.

For this reason, the invention addresses, based on the subject matter of US 2011/0008138 A1, the object of developing a transport robot with a loading device such that an arbitrary number of items to be transported, lying behind one another and/or, if applicable, also placed next to one another, can be gripped and pulled onto the transport robot, independently of the dimensions of the items to be transported.

Accordingly, it should be possible with the invention to avoid the spacing, previously necessary with the prior art, between the items to be transported that are disposed behind one another and/or next to one another in a shelf space, with the aim that the items to be transported can be stored in a tightly packed manner, thus increasing the overall storage capacity in a warehouse consisting of 10,000 storage spaces or more, by more than 20 percent.

In order to attain this objective, the invention is characterized by the technical teachings in claim 1.

One feature of the invention is that at least one loading arm is disposed on the transport robot, which is driven such that it can be displaced toward the right and left on the transport robot, which has a loading head, in each case, on its front side and on the opposing side, and the two loading heads are encompassed by a shared toothed belt, wherein the toothed belt is guided, in the form of a continuous loop, over the guide rollers of a carriage in the transport robot, which is driven such that it can be displaced longitudinally.

With this technical teaching, there is the advantage that a double ended loading arm, longitudinally symmetrical, has a left-hand and a right-hand loading head, and the two loading heads are connected to one another by means of a shared toothed belt, such that they move in an interactive manner. The toothed belt is powered by a first drive motor, and the toothed belt runs as a continuous loop over the guide rollers for the carriage in the transport robot, which is driven such that it can be displace in the direction of the longitudinal axis of the loading arm.

As a result, there is the advantage that the upper surface of the upper portion of the toothed belt is intended for passing beneath a load, without the need for a pawl that can be pivoted outward, because the transport belt rests with its upper surface in a friction-locking manner against the undersurface of the load that is to be received, and when the toothed belt is driven, the item to be transported is pulled onto the transport robot due to the friction-locked placement on the upper portion of the toothed belt.

Accordingly, it is important that the surface of the loading arm that is to receive the load is now designed as the upper portion of a continuous toothed belt, such that the toothed belt is driven by a first drive motor with respect to its displacement position.

The load is thus moved onto the toothed belt in relation to the drive for the toothed belt, and either pushed from the upper surface of the loading arm onto a high-bay storage shelf, or—in reverse—received from a storage space in a shelf, and pulled onto the upper surface of the transport robot.

It is important that the continuous toothed belt is now also a component of a loading arm that can be displaced longitudinally, which can be extended front the transport robot at both sides. For this purpose, it is provided that the continuous toothed belt is guided over suitable guide rollers for a carriage, and the carriage is driven by a second drive motor such that it can be displaced in the transport robot. The carriage is driven such that it can be displaced, accordingly, to the left or right side of the transport robot, along the longitudinal axis of the loading arm, and can remain stationary at any arbitrary intermediate position.

With regard to the displacement of the carriage in the transport robot, the loading head of the loading arm is thus pushed to the left or right, out of the transport robot, and is suitable for reaching under the load, in that the upper portion of the aforementioned toothed belt rests in a friction-locking manner against the bottom surface of the item to be transported.

In a first design of the invention, it is provided that each loading arm consist of only one single toothed belt, which is suited for being guided beneath the bottom surface of the item to be transported.

In order, however, to obtain a certain symmetry in the loading movement, it is preferred that, instead of the one toothed belt, two toothed belts, disposed parallel to one another and at a spacing to one another, are used, which are driven synchronously. The two toothed belts are guided by means of guide rollers that are parallel to one another, on the carriage disposed centrally between the toothed belts, such that a synchronous movement of the two toothed belts by means of the guide rollers on the carriage occurs.

The carriage is accordingly displaced laterally in one or the other transverse axes of the transport robot, and thus the two toothed belts are also pushed out of the left or right side of the transport robot in a synchronous manner.

Because of the tact that the carriage, driven in a displaceable manner, is provided in the intermediate space between the two toothed belts, a particularly compact structure and a small device is obtained, because the centrally disposed carriage serves for the synchronization of both the left and right toothed belt in the shared arm.

In a further design of the invention, it is provided that the double toothed belts are likewise doubled, such that two loading arms disposed parallel to one another are provided on the upper surface of a transport robot, wherein each loading arm consists of two respective toothed belts, driven synchronously to one another.

Accordingly, with this embodiment, there are a total of four toothed belts present, wherein two respective toothed belts form one loading arm, and each loading arm is formed by a separately driven carriage, which is disposed, in each case, between the two toothed belts, and can be displaced there.

In this manner, the loading device on the transport robot is formed by two loading arms that can each be extended and retracted laterally, and each loading arm is formed by two toothed belts respectively, which are suited for being guided beneath the bottom surface of the item to be transported.

In the following description of the figures, this double assembly, having two loading arms and a total of four toothed belts, is described, although the invention is not restricted thereto.

It should be emphasized that in the simple embodiment a loading arm of this type can consist of just a single continuous toothed belt, which is guided over a single carriage that is driven in a displaceable manner.

By means of the design for the toothed belt as a continuous circumferential toothed belt that is guided over stationary guide rollers and drive rollers in the transport robot, and also over guide rollers in displaceable carriages, there is the advantage that a particularly simple accommodation of the load is possible, with no tilting and in a space saving manner.

It is provided that the loading head, which is disposed in each case at the outer free end of the loading arm, approaches the front edge of the item to be transported, and that a ramp is disposed at this side of the loading head, such that, when the loading head approaches the front, lower base edge of the item to be transported, this ramp is raised slightly, and the toothed belt for the loading head catches under the item to be transported at precisely this point, and is no longer moved thereafter.

At this raised pivotal position, the toothed belt is then driven such that the entire loading arm is driven further under the base surface of the item to be transported, but no relative movement of the upper portion of the toothed belt and the base surface of the item to be transported occurs. In this manner, a particularly smooth picking up of the item to be transported is ensured, because a relative movement, and thus an undesired abrasion of the upper surface of the toothed belt against the base surface of the item to be transported is avoided.

Accordingly, it is important that with this lifting, due to the synchronous driving of the carriage with the second drive motor, and due to the drive, synchronized therewith, for the longitudinal displacement of the transport belt, a relative movement between the toothed belt at the underside of the item to be transported and the item to be transported itself is avoided, and the loading arm is then guided fully under the underside of the item to be transported.

At this point it is not necessary that there be a gap between the back surface of the first item to be transported and the front surface of the subsequent second item to be transported, because there is no need for a pawl that can be opened or pivoted inward.

The extension length of the respective loading arm is thus adjusted to the length of the item to be transported, and it is ensured, as a result, that the arm only reaches under undersurface of the respective item to be transported that is to be picked up at that time, while the second item to be transported, packed tightly behind the first, is not touched by the toothed belt. In this manner, the aforementioned advantage, that the storage capacity in an automated shelving of this type is improved by 20 percent, is achieved due to the tight packing of the items to be transported, disposed behind one another in a storage shelf.

In a further development, the invention also provides that the items to be transported can also be tightly packed next to one another, and nevertheless a precise gripping and displacement of items to be transported that are placed next to one another is also possible with the features of the invention.

According to a further feature of the invention, it is preferred that the front end of the respective loading head is supported by a support roller, which is braced in a suitable profile in the high bay storage shelving, and is designed such that it can be displaced along this profile.

In this manner, the load that is exerted on the loading arm when lifting the item to be transported is accommodated by the support roller, and thus does not act on the loading arm itself, causing a bending thereof, or transferring a torque thereto. As a result, the loading arm will not bend, and can be extended to a length of, for example, up to 1,000 mm, depending on the size of the transport robot.

The length of the loading arm corresponds to the width of the transport robot and, according to the invention, the loading arm can thus be extended longitudinally to the left or right side, corresponding to the width of the transport robot. As a result, the aforementioned loading length is obtained, preferably lying in the range of 600 to 1,000 mm.

It is advantageous that particularly small objects can also be picked up, because the length of the loading arm can be arbitrarily shortened or lengthened. Likewise, short objects can be picked up, because this no longer relies on a form-locking placement of a loading pawl at the back of an item to be transported.

A further advantage of the invention is that numerous items to be transported, lying behind one another, can also be accommodated simultaneously, and pulled onto the transport robot, or pushed off of the transport robot.

Furthermore, it is preferred that two parallel loading arms are disposed on the transport robot for particularly wide items to be transported.

The assembly on the transport robot does not necessarily mean that the loading assembly is integrated with the transport robot such that it cannot be released. A modular assembly can also be provided, in which the entire loading assembly, consisting of either a single or two parallel loading arms, is accommodated in a loading module, which in turn is connected to the transport robot.

Because of the fact that the item to be transported rests at its undersurface on the upper surface of a toothed belt, the entire loading arm can also be used as a continuous conveyor. This means that, in order to extend the loading arm, the carriage does not have to be driven. Instead, the loading arm remains at its central position on the transport robot, and the item to be transported is moved from the middle of the transport robot to one side, solely by means of the displacement drive for the continuous toothed belt, and can be delivered, for example to a conveyor belt next to the transport robot.

The subject matter of the present invention can be derived not only from the subject matter of the individual claims, but also from combinations of the individual claims.

All of the information and features disclosed in the documents, including the abstract, and in particular, the spatial design depicted in the drawings, are claimed as essential to the invention, to the extent that they are novel, individually as well as in combinations, with respect to the prior art.

In the following, the invention shall be explained in greater detail based on drawings depicting only one mode of execution. Further features and advantages of the invention that are substantial to the invention can be derived from the drawings and the descriptions thereof.

Shown are:

FIG. 4: the detail D from FIG. 3, FIG. 5: the same depiction as that in FIG. 3, wherein, however, the loading arm has been guided under the front edge of the item to be transported, FIG. 6: an enlargement of the detail C from FIG. 5, FIG. 7: a schematic top view of a transport robot having two parallel longitudinal conveyors, wherein each longitudinal conveyor consists of a pair of toothed belts that are driven synchronously, FIG. 12: the front view of the assembly according to FIG. 10, FIG. 13: a cutaway similar to that in FIG. 8, wherein, however, the cut is made at a different plane, in order to show the guide rollers on the carriage that is driven in a displaceable manner.

The fundamental construction of the loading device according to the invention can be derived from FIGS. 1-4.

Figure 1:
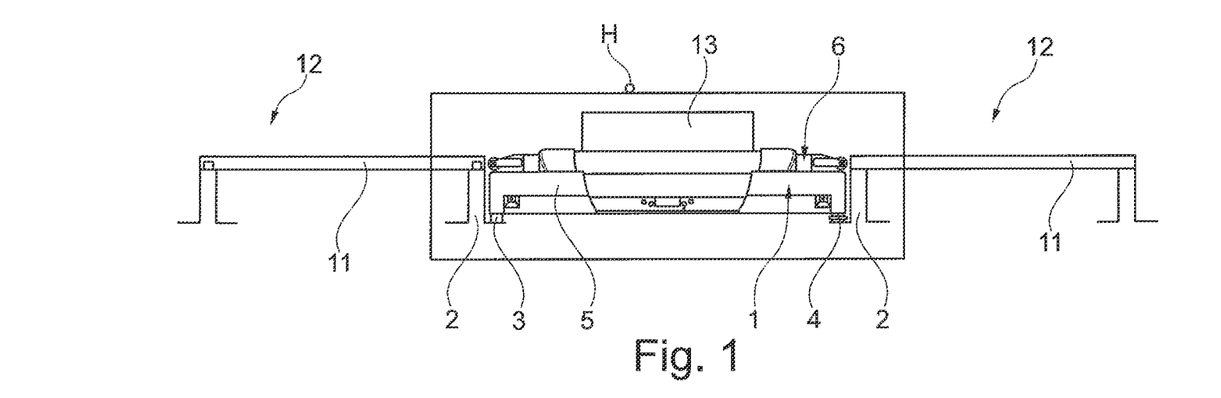
FIG. 1: a front view of a transport robot, with a loading device in the retracted state.

According to FIG. 1, a loading device, which is designed as the (at least one) longitudinal conveyor 6, is disposed on a transport robot 1.

Figure 7:
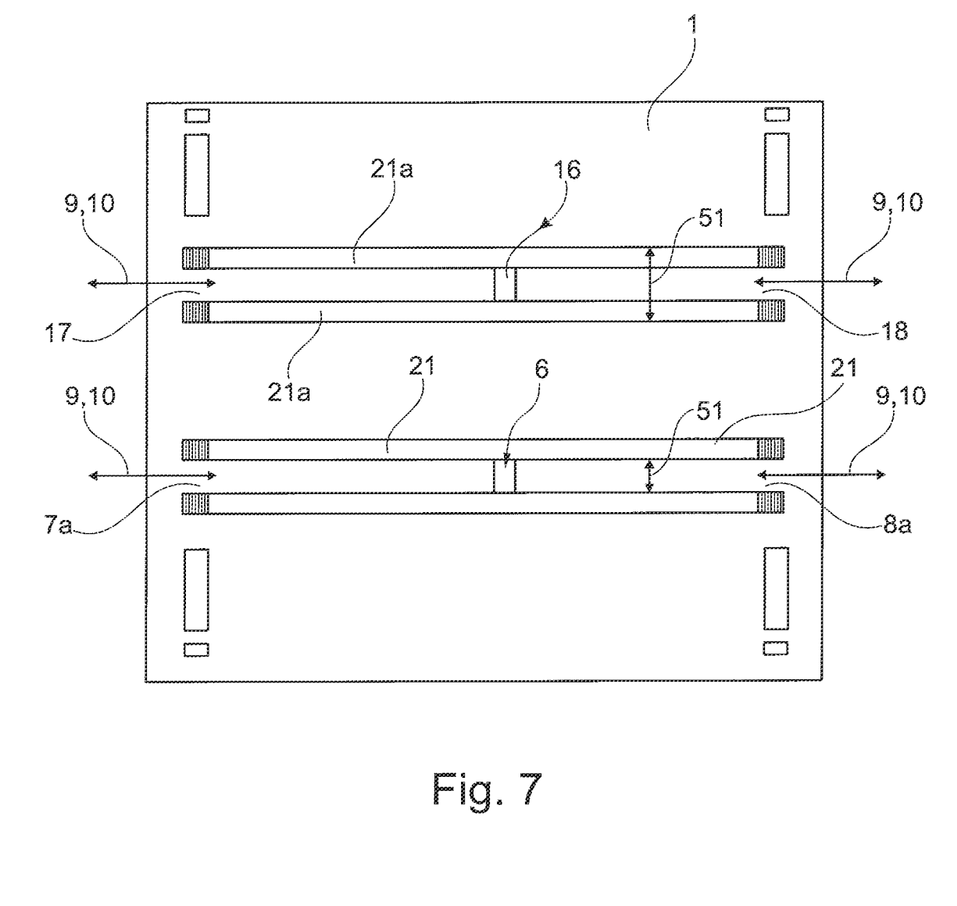

According to the depiction in FIG. 7, two parallel longitudinal conveyors 6, 16 are disposed, in an expansion of the invention, on the upper surface of the transport robot 1, wherein each of the longitudinal conveyors 6 or 16 function according to the same principle. Therefore, it is sufficient to describe the construction of a single longitudinal conveyor, because the other has the exact same design.

Each of the longitudinal conveyors 6, 16 has toothed belts 21, driven at a spacing to one another, and parallel to one another, as is depicted in FIG. 7.

The toothed belt for the longitudinal conveyor 16 is indicated by the numeral 21, while the toothed belt for the longitudinal conveyor 6 is indicated by the numeral 21*a*.

Thus, for each longitudinal conveyor, there are a total of two toothed belts 21*a*, 21*a*, or 21, 21, spaced apart from one another and synchronous to one another, wherein only the drive for one of the individual toothed belts 21*a* or 21 shall be described in the following description, because the other toothed belts in the quadruple toothed belt assembly according to FIG. 7 have the exact same design, and are driven in exactly the same manner.

It is important in the depiction according to FIG. 7 that, in each case, a carriage 33 is disposed between the two spaced apart toothed belts of the longitudinal conveyors 6 and 16, which ensures that the two toothed belts are driven synchronously to one another, and that when the carriage is displaced, the loading head 7*a*, 8*a* on the respective free ends of the loading arm 7, 8 is extended from the transport robot, either to the left or the right, selectively.

It is depicted in FIG. 1 that the longitudinal conveyor 6 according to FIG. 7 has a loading arm 7 on the left side, belonging to the longitudinal conveyor 6, and forming a loading head on its free side.

Figure 2:
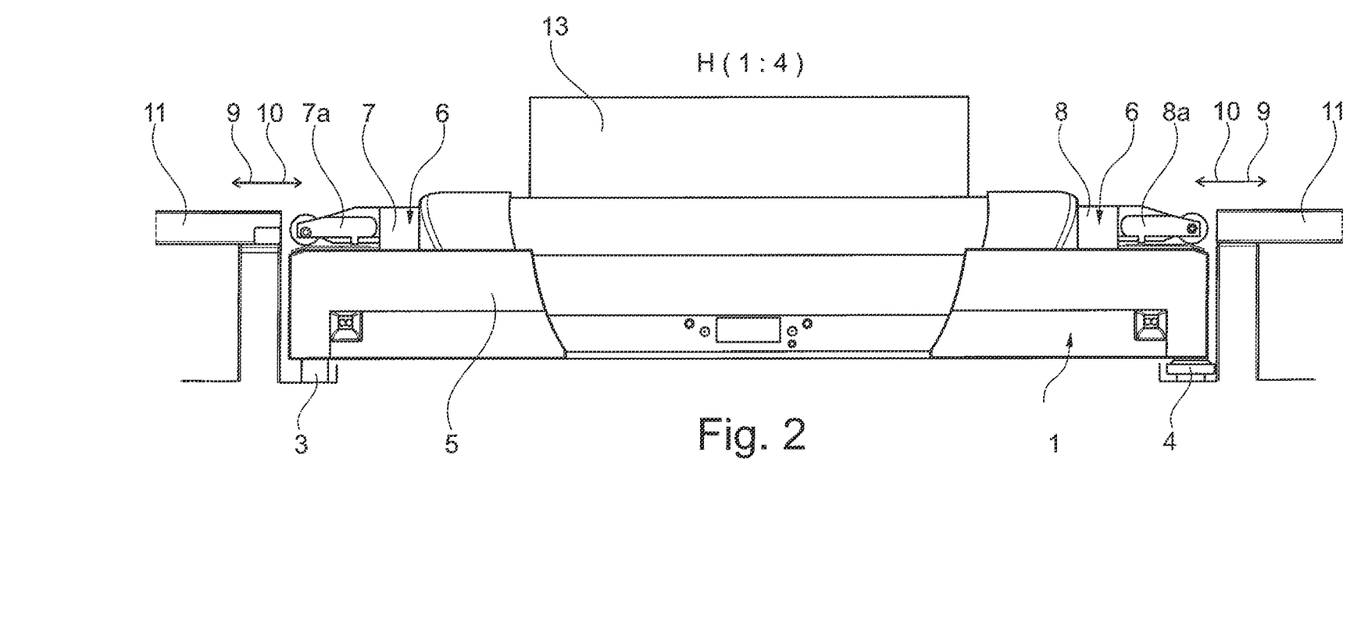
FIG. 2: the detail H from FIG. 1, in an enlargement.

The same applies for the right side of the longitudinal conveyor 6 in FIG. 2, where it can be seen that the loading arm 8 there forms a loading head 8*a*, which can be extended or retracted in the directions of the arrows 9, 10. The same applies to the loading arm 7 on the left side.

The transport robot 1 is driven in a displaceable manner on a pair of tracks 2 lying in the drawing plane for FIG. 1, and has carrying wheels 3 disposed in pairs on the left side, which are supported on the right side by guide wheels 4.

The transport robot also has a base frame 5, on which the loading device 6, 16 is disposed.

In order to pick up or deposit an item to be transported 13, the transport robot 1 is moved to a position where it is flush in relation to a delivery plate 11 in a high bay storage shelf 12. This is depicted in FIGS. 1 and 2. The item to be transported 13 then rests on the upper surface of the longitudinal conveyor 6.

Figure 3:
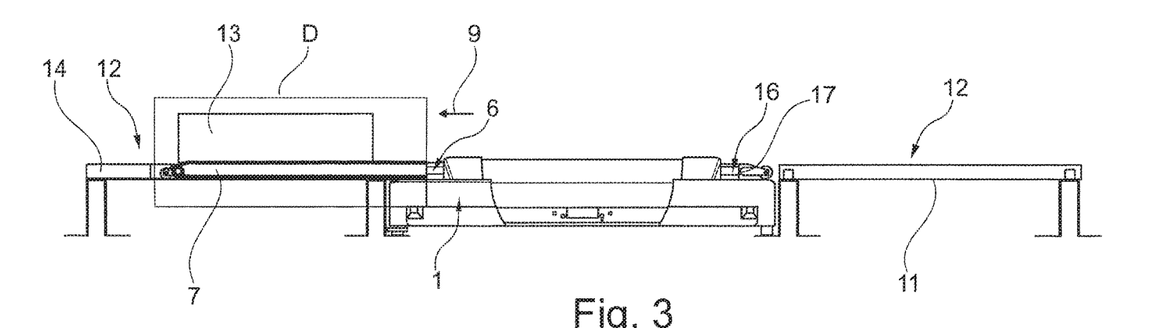
FIG. 3: the transport robot according to FIG. 1, with a loading device extended toward the left.
Figure 4:
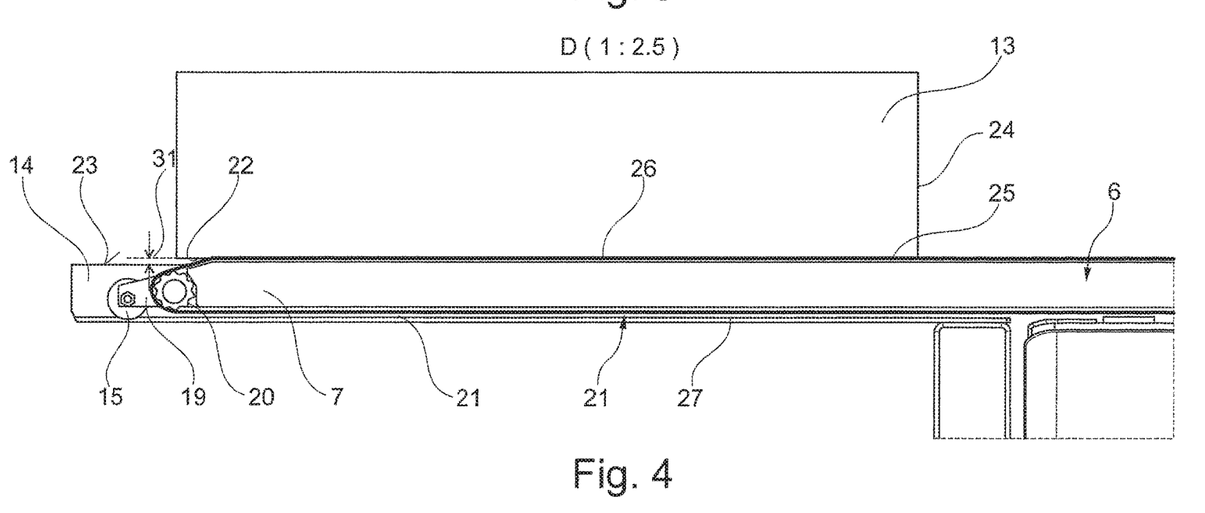
Figure 5:
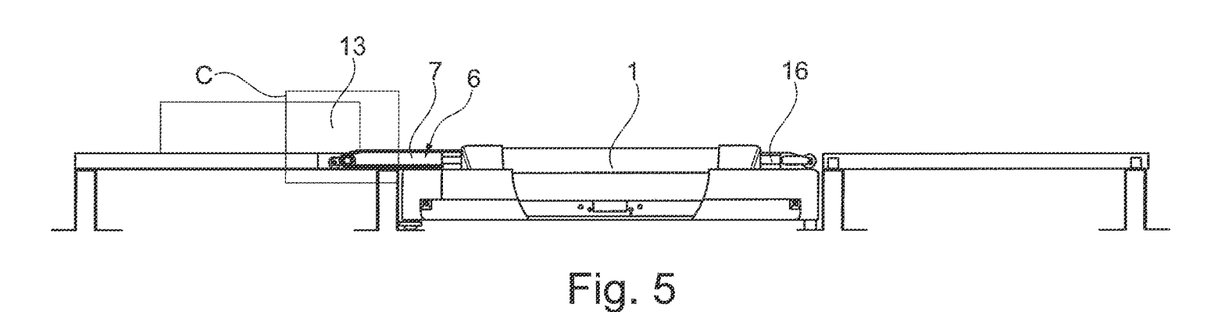

According to FIGS. 3 and 4, the item to be transported 13 is deposited, wherein the underside of the item to be transported lies on the upper portion of a continuous toothed belt 21. This upper portion is indicated with the numerals 21a or 21b in FIG. 8.

The loading head 7, 8 is fed through a deflecting belt pulley 20, which is not driven, wherein a support arm 19 rests against the axle of the pulley 20, which is supported by a front support roller 15, which is supported in the hollow profile 15 in the shelf space 12.

In this manner, the loading arm 7, 8 can be extended over an arbitrary loading length, without bending, because the support rollers 15 in the hollow profile 14 on the high bay storage shelf 12 provide the necessary support.

According to one feature of the invention, it is furthermore preferred that the item to be transported 13 is raised in the direction of the arrow 28 when being picked up.

Figure 6:
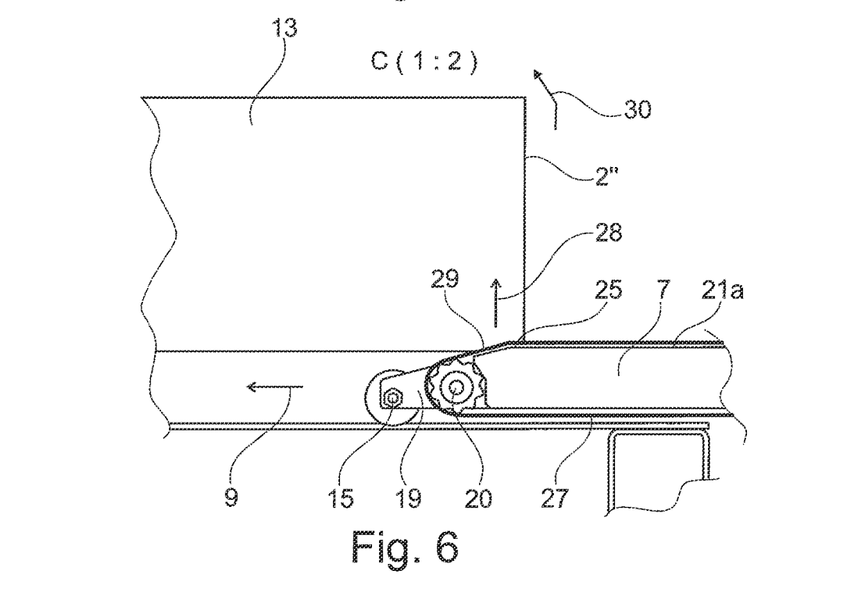

A lifting motion 28 with respect to the front edge 24 is carried out as a result, in accordance with FIG. 6, in that the loading arm 7 is first moved in the direction of the arrow 9 to where it meets the front edge 24 of the item to be transported 13, and lifts this front edge by means of a lifting motion 28, while the toothed belt forms a ramp 29 with its upper portion, which ensures that the front edge 24 of the item to be transported 13 is pivoted upward, in the direction of the arrow 30.

The toothed belt 21 remains at the position 25 when it engages with the item to be transported, and is not displaced any further. After the item to be transported 13 is raised by means of the lifting motion 28, the transport belt 21 remains fixed at the position 25. The loading arm 7 is then driven, in the direction of the arrow 9, further under the stationary undersurface of the item to be transported, without resulting in a relative movement of the upper portion 21a of the toothed belt 1 and the bottom surface of the item to be transported 13.

This ensures a particularly smooth, gentle handling of the item to be transported, and prevents the occurrence an undesired relative movement in relation to the loading arm when picking up or depositing the item.

In the general description it is indicated that each loading arm 6 consists of two toothed belts 21 or 21a, which are driven parallel to one another.

The two toothed belts 21 or 21a are synchronized by means of a carriage 33 that is disposed such that it can be displaced in a synchronous manner in an intermediate space between the toothed belts.

With respect to the displacement of the carriage 33 in the directions of the arrows 9, 10, the entire loading arm 7 or 8 on the longitudinal conveyor is thus displaced toward the left or right, as is also the case with the other loading arm 17, 18 of the longitudinal conveyor 16, disposed parallel, and at a spacing, thereto.

It can be derived from FIG. 4 that the item to be transported is raised from the surface of the shelf in the shelf space 12 by the lifting motion in the direction of the arrow 28, by means of which, according to FIG. 4, the upper edge 23 of the hollow profile 14 is then located beneath the bottom 22 of the item to be transported 13, and thus, a gap 31 is formed.

Thus, the item to be transported is accommodated at its bottom 22 entirely on the upper surface of the two toothed belts 21a, 21b, disposed parallel to one another, and is supported solely by these toothed belts.

Figure 8:
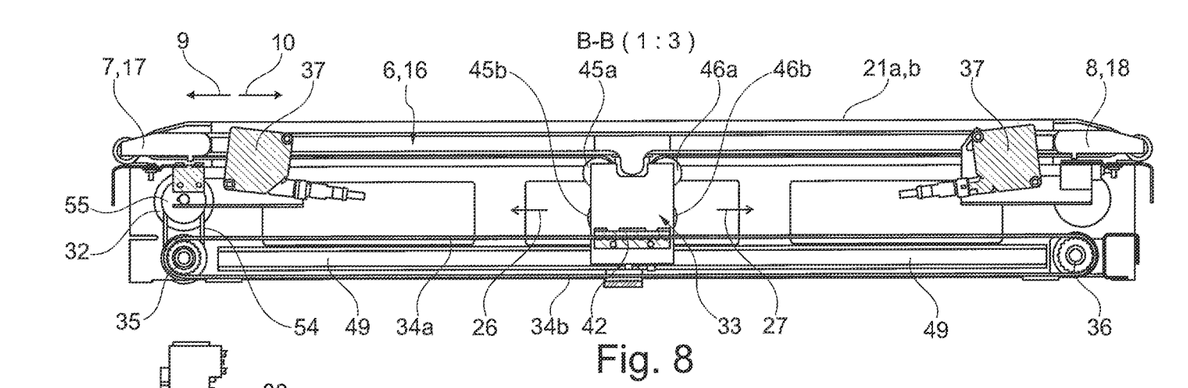
FIG. 8: a cutaway view of the front view of the loading device depicting the carriage that is driven in a displaceable manner, cut along the line B-B in FIG. 9, FIG. 9: the top view of the assembly according to FIG. 8, FIG. 10: the top view of an assembly similar to that in FIG. 9, FIG. 11: the cut along the line A-A in FIG. 10, through the carriage that can be driven in a displaceable manner.
Figure 9:
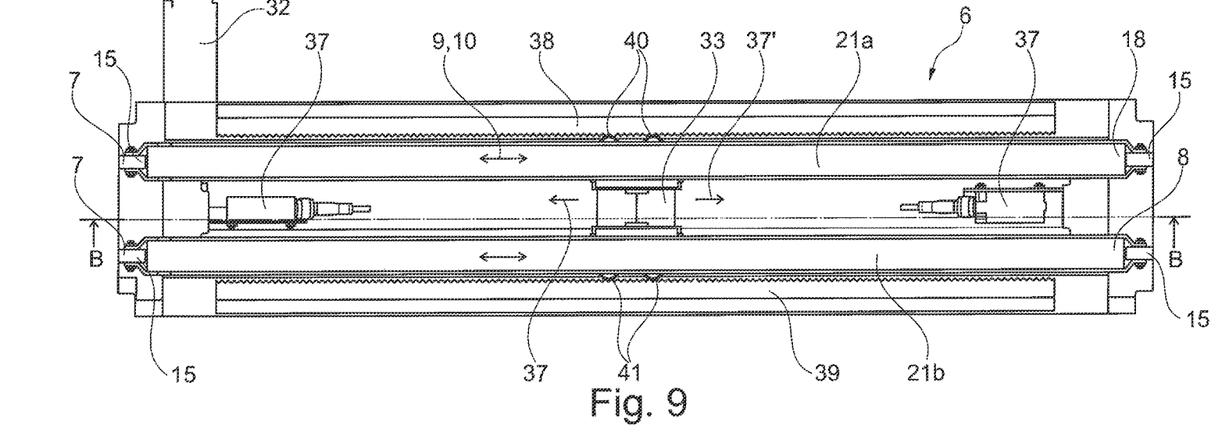
Figure 10:
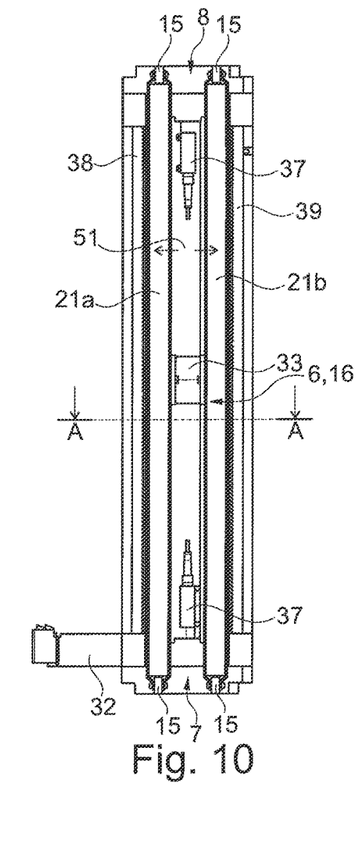

The displacement drive for the loading arms 7, 8 shall now be explained based on FIGS. 8 and 9.

It is visible that a carriage 33 is driven in a displaceable manner in the central area of the transport robot 1, or in as module connected to the transport robot 1, which forms the loading device, and this being in the directions of the arrows 26 and 27. The displacement in the directions of the arrows 26, 27 occurs in that the carriage has a clamping device 42 for establishing a clamping connection to the upper portion 34a of a toothed belt 34, and the toothed belt 34 is guided over a drive roller 35, driven such that it rotates, and the lower portion 34b of the toothed belt is guided over a guide roller 36 that is not driven.

The drive for the drive roller 35 occurs via a connection belt 54, which is frictionally connected to the drive gear 55 of a drive motor 32.

The drive motor 32 forms the displacement drive for the carriage 33 in the directions of the arrows 26 and 27.

In order to determine the necessary extension depth, or thrust depth, for the respective loading arm 7, 8, distance meters 37 are provided on both sides, facing outward, which are directed toward the front of the item to be transported 13, and determine the spacing to the item to be transported. This can be a laser distance meter. Instead, ultrasound distance meters or optical distance meters can also be used.

Figure 14:
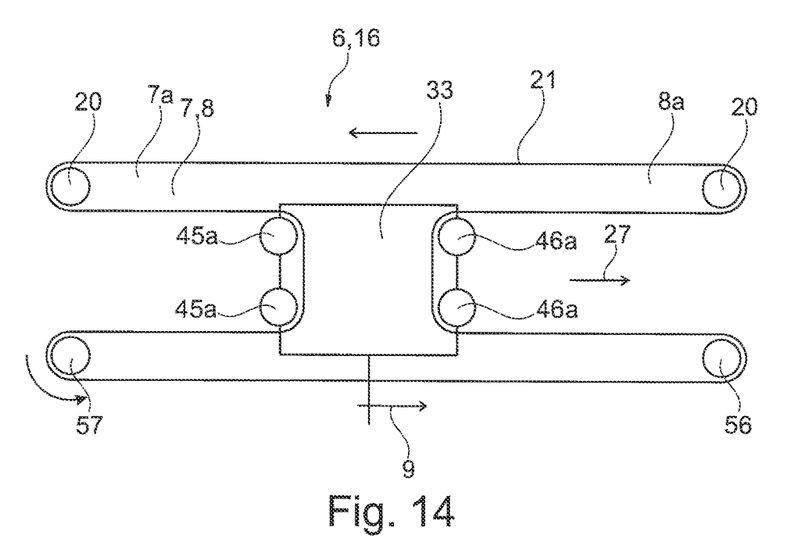
FIG. 14: a schematic depiction of the toothed belt drive for a longitudinal conveyor having a carriage disposed at the middle position.

If the carriage 33 is displaced to the right, in the direction of the arrow 27, according to FIG. 14, then the entire loading arm is displaced toward the right, and the right-hand loading head 8a is extended, while the left-hand loading head is displaced to the middle region of the transport robot 1.

Figure 15:
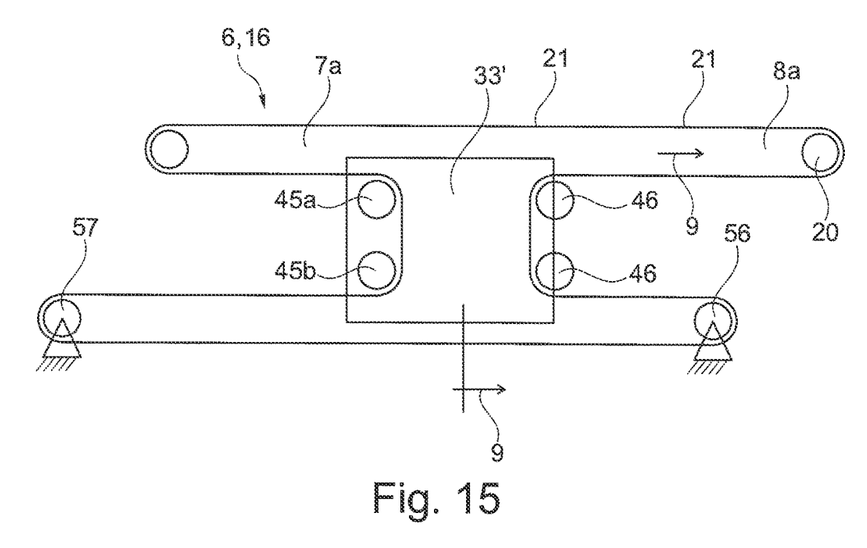
FIG. 15: the same depiction as that in FIG. 14, in which the carriage is displaced in one direction in order to displace the loading arm.

As a result, the entire loading arm is extended toward the right when the carriage 33 is displaced toward the right, in the direction of the arrow 27 according to FIGS. 14 and 15.

According to FIG. 9, the carriage synchronizes the two continuous toothed belts to one another, because the carriage is disposed, according to FIG. 9, in the intermediate space between the two continuous pairs of toothed belts 21a, 21b.

Only one single continuous toothed belt is shown in FIGS. 14 and 15, while in fact, according to FIG. 9, the carriage 33 is disposed between two toothed belts, driven synchronously.

The carriage 33 forms the synchronizing element with its guide rollers 45a, 45b, and 46a and 46b, for a synchronous drive of the two toothed belts 21a and 21b, driven parallel to one another, and collectively.

The drive motor 52, which is provided for driving the toothed belts 21 in order to obtain—independently of the displacement position of the carriage 33—a longitudinal displacement of the entire toothed belt, shall be described in the following.

Figure 11:
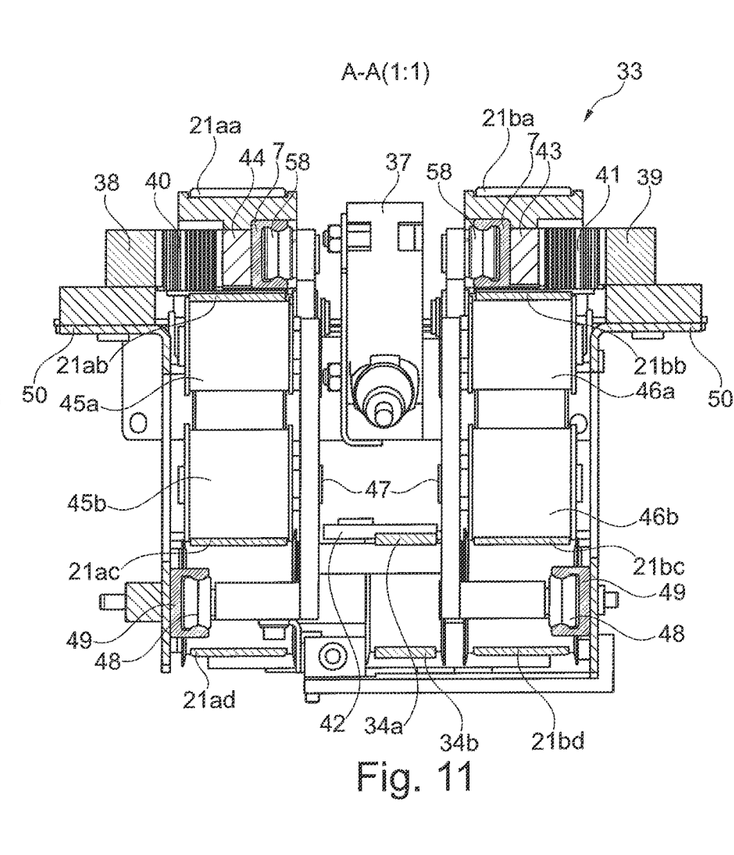
Figure 12:
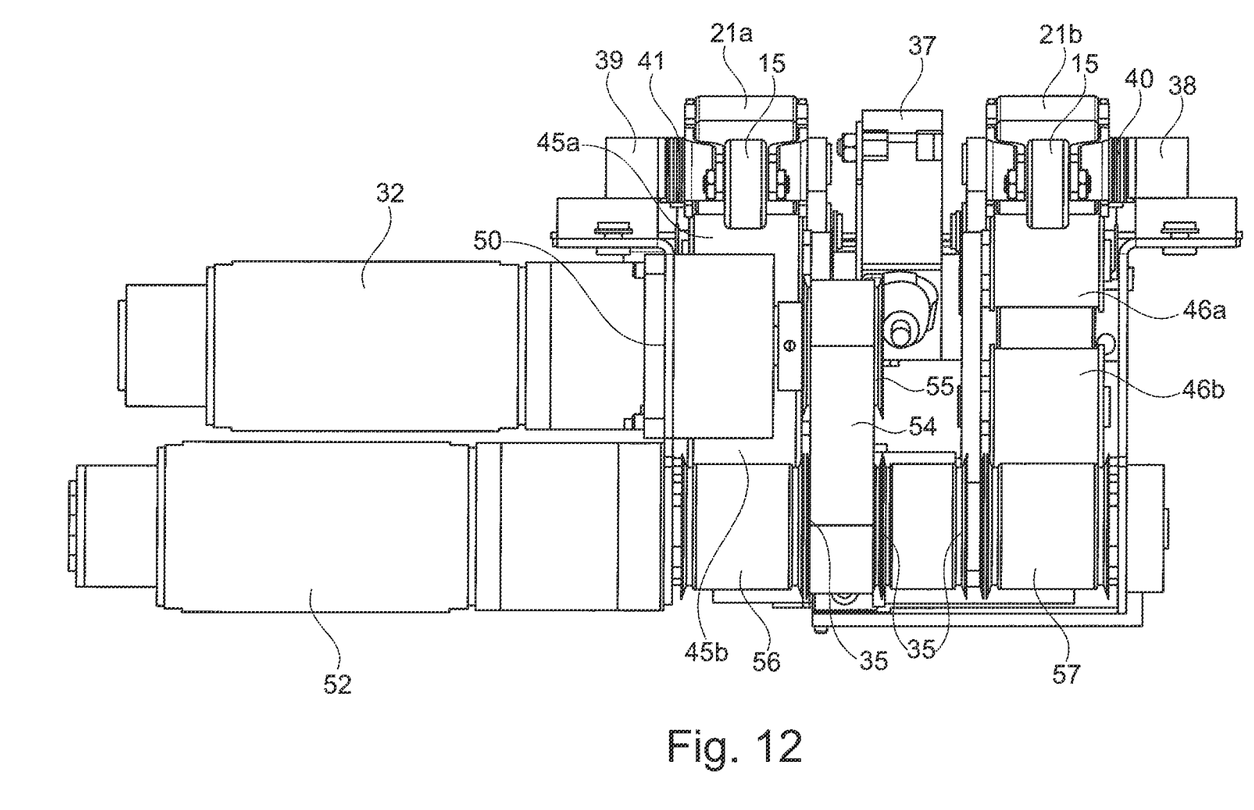

For this purpose, FIG. 11 shows a cut through the carriage 33. Rotatable guide rollers 45a, 45b and 46a, 46b are disposed on a supporting frame 50.

The supporting frame 50 is guided in a displaceable manner by means of guide rollers 58 in the loading arm 7 or 8, respectively.

For this purpose, guides 49 are provided, which are disposed in the respective loading arm 7 or 8.

The axles for the gear wheels 40, 41 are attached to the carriage, or on the supporting frame 50 for the carriage 33, respectively, as can be derived from FIG. 9 in comparison with FIG. 11.

These gear wheels 40, 41 roll against toothed rods 38, 39, which are connected to the transport robot 1 in each case by means of a supporting frame 50. Accordingly, each gear wheel 40, 41 rolls along the associated stationary toothed rod 38, 39 in the transport robot 1.

A toothed rod 43, 44 is disposed in each case in the respective loading arm 7, 8, which meshes with the respective gear wheel 40, 41.

In this manner, a gear ratio for the displacement movement of the carriage 33 is obtained, resulting in doubling the length of the displacement movement for the loading arm 7, 8. Accordingly, if the carriage 33 is displaced in the indicated directions of the arrows 9, 10 over a specific distance, then the loading arm 7, 8 allocated thereto is displaced twice the distance.

The gear ratio for the displacement movement of the carriage 33 by the doubled displacement length of the loading arm 7, 8 thus occurs by means of the gear ratio for the gear wheels 40, 41, which roll, on one hand, along the stationary toothed rods 38, 39, and which furthermore roll over twice the distance on the opposite side of the toothed rods 33, 34 connected to the carriage 33.

Thus, a doubled gear ratio of the displacement movement is obtained.

Figure 13:
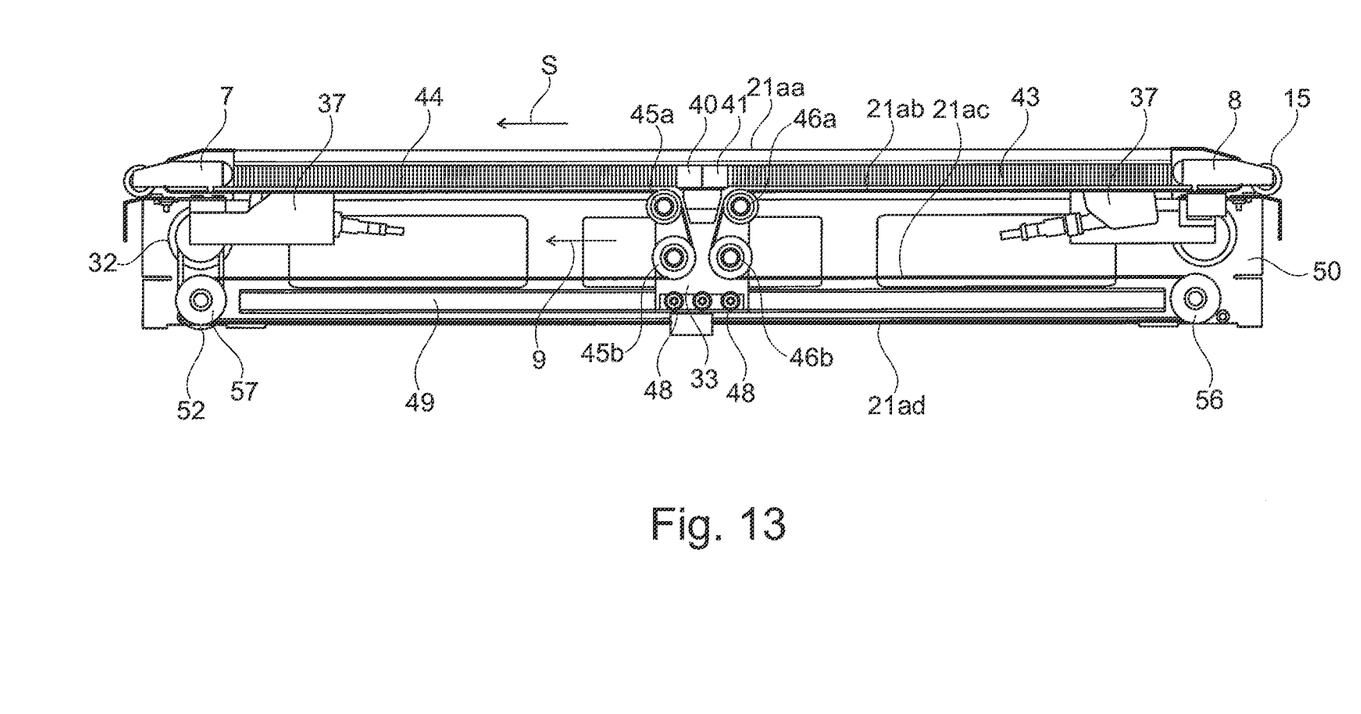

In the following, the manner in which guidance of the toothed belt 21 over the carriage 33 occurs shall be explained. This is depicted in FIG. 13.

The carriage 33 is guided in a displaceable manner in a guide 49 in the transport robot 1, or in a module of the transport robot 1, respectively, by means of guide rollers 48.

The carriage 33 has two guide rollers 45a, 45b, and 46a, 46b, disposed at a spacing to one another, and in pairs.

All of the guide rollers 45, 46 are provided for guiding a continuous toothed belt 21, wherein the upper portion of the toothed belt, supporting the bottom of the item to be transported 13, is indicated by the numeral 21aa.

The portion of the toothed belt lying below this is indicated by the numeral 21ab, while the middle, third portion is indicated by the numeral 21ac, and lowermost portion of the toothed belt is indicated by the numeral 21ad.

The lower guidance for the toothed belt 21 is obtained by means drive motor 52, which drives the belt pulley 57 in a rotational manner, while the other belt pulley 56 serves solely as a guide. Accordingly, the toothed belt 21 is guided continuously via the belt pulley 20 on the respective loading arm.

In FIG. 13, the aforementioned gear wheels 40, 41 are also illustrated, these being the gear wheels corresponding to the respective toothed rods 43, 44.

It can be derived from FIG. 7 that in each case, there is a spacing 51 between the individual toothed belts 21, 21a.

The drive principle for the continuous toothed belt 21 is depicted in FIGS. 14 and 15. When the carriage 33 is displaced in the direction illustrated by the arrow 9, the loading arm is simultaneously displaced toward the right, in the direction of the arrow 9. At the same time, the continuous circumferential toothed belt 21 is moved with it, and is driven such that it can be displaced separately from the displacement of the carriage 33.

It should also be noted that, instead of a toothed belt 21, other longitudinal conveyor elements can also be used, such as, for example, rope belts, chains, flat drive belts, V-belts and suchlike.

The term "toothed belt" should thus be regarded in the broadest sense, because it can also be replaced by rope belts, round belts, triangular belts, V-belts and suchlike.

REFERENCE SYMBOLS 1 transport robot
2 track pair
3 carrying wheel
4 guide wheel
5 base frame
6 longitudinal conveyor
7 loading arm (for 6)
7a loading head
8 loading arm (for 6)
8a loading bead
9 direction of arrow
10 direction of arrow
11 delivery plate
12 shelf space
13 item to be transported.
14 hollow profile
15 support roller
16 longitudinal conveyor
17 loading arm (for 16)
18 loading arm (for 16)
19 support arm (for 15)
20 belt pulley
21 toothed belt aa, ab, ac, ad
22 bottom (of 13) ba, bb, bc, bd
23 upper edge (of 14)
24 front edge (of 13)
25 position
26 direction of arrow
27 direction of arrow
28 lifting movement
29 ramp
30 direction of arrow
31 gap
32 drive motor (for 33), displacement drive
33 carriage
34 toothed belt (for 33)
34a upper portion
34b lower portion
35 drive roller
36 guide roller
37 distance meter
38 toothed rod
39 toothed rod
40 gear wheel (for 33)
41 gear wheel (for 33)
42 clamping device
43 toothed rod
44 toothed rod
45 guide roller a, b
46 guide roller a, b
47 frame (for 33)
48 guide roller
49 guide
50 supporting frame
51 spacing
52 drive motor (for 21) (drive for toothed belts for longitudinal displacement)
53
54 connection belt
55 drive gear
56 belt pulley 57 belt pulley
58 guide roller (for 6, 16)

The invention claimed is:
1. A transport robot, comprising:
a loading device for loading and unloading goods to be transported on the transport robot, wherein the goods to be transported are stored at a side relative to a direction of travel of the transport robot in a storage shelf and the loading device is driven so as to be displaceable and able to travel over at least one of the two sides of the external contour of the transport robot and can be brought into contact with the goods to be transported, wherein the loading device comprises:
a first loading arm comprising
a longitudinal conveyor for gripping underneath the underside of the goods to be transported, wherein the loading arm is driven by
an endless toothed belt, wherein the endless toothed belt is guided by means of
a carriage which is driven so as to be displaceable in the transport robot, the displacement of which controls a direction of displacement of the first loading arm, wherein
a loading head is arranged at the outer free end of the loading arm, wherein
a ramp is arranged on the side of the loading head and wherein the toothed belt is guided over
a deflecting belt pulley on the loading head, the endless toothed belt disposed on and guided by the deflecting belt pulley at an extent of the endless toothed belt along the direction of displacement of the first loading arm, wherein the front end of the loading head has a supporting roller spaced from the deflecting belt pulley along the direction of displacement of the first loading arm, the supporting roller sized, shaped and positioned to support the loading head in a hollow profile of the storage shelf and a supporting arm bears on a spindle of the belt pulley and the supporting roller is arranged on the supporting arm, the supporting arm spacing the supporting roller from the deflecting belt pulley and the endless toothed belt along the direction of displacement of the first loading arm.

2. The transport robot according to claim 1, wherein the loading device comprises a second loading arm opposing the first loading arm.

3. The transport robot according to claim 2, wherein the second loading arm comprises a second longitudinal conveyor driven by a second endless toothed belt.

4. The transport robot according to claim 3, wherein the endless toothed belt comprises two toothed belts arranged parallel to one another and spaced a distance from one another and are driven synchronously and wherein the two toothed belts are guided over a pair of guide rollers which are parallel to one another on the carriage arranged in the middle between the toothed belts.

5. The transport robot according to claim 3, wherein the first loading arm comprises two loading arms arranged parallel to one another on the transport robot, wherein each loading arm comprises a pair of toothed belts which are driven synchronously with one another, the endless toothed belt comprising the pair of toothed belts on each loading arm.

6. The transport robot according to claim 2, wherein the endless toothed belt comprises two toothed belts arranged parallel to one another and spaced a distance from one another and are driven synchronously and wherein the two toothed belts are guided over a pair of guide rollers which are parallel to one another on the carriage arranged in the middle between the toothed belts.

7. The transport robot according to claim 2, wherein the first loading arm comprises two loading arms arranged parallel to one another on the transport robot, wherein each loading arm comprises a pair of toothed belts which are driven synchronously with one another, the endless toothed belt comprising the pair of toothed belts on each loading arm.

8. The transport robot according to claim 1, wherein the endless toothed belt comprises two toothed belts arranged parallel to one another and spaced a distance from one another and are driven synchronously and wherein the two toothed belts are guided over a pair of guide rollers which are parallel to one another on the carriage arranged in the middle between the toothed belts.

9. The transport robot according to claim 8, wherein the first loading arm comprises two loading arms arranged parallel to one another on the transport robot, wherein each loading arm comprises a pair of toothed belts which are driven synchronously with one another, the endless toothed belt comprising the pair of toothed belts on each loading arm.

10. The transport robot according to claim 1, wherein the first loading arm comprises two loading arms arranged parallel to one another on the transport robot, wherein each loading arm comprises a pair of toothed belts which are driven synchronously with one another, the endless toothed belt comprising the pair of toothed belts on each loading arm.

11. The transport robot according to claim 1, wherein the supporting roller is supported on an axis of rotation offset from an axis of rotation of the deflecting belt pulley.

12. A method for operating a transport robot having a loading device for loading and unloading goods to be transported on the transport robot, wherein the goods to be transported is stored in a high-bay storage shelving to the side of the direction of travel for the transport robot, the method comprising:
driving the loading device in a displaceable manner,
guiding the loading device over at least one of the two sides of an outer contour of the transport robot;
bringing a loading head of the loading device into contact with the goods to be transported;
guiding the loading head to the front edge of the goods to be transported so that a ramp is disposed at a side of the loading head; and
lifting the goods to be transported when the loading head is guided to the front, lower bottom surface thereof, and a toothed belt of the loading head locks onto the goods to be transported and is no longer moved thereafter, wherein the loading device comprises:
a first loading arm comprising
a longitudinal conveyor for gripping underneath the underside of the goods to be transported, wherein the loading arm is driven by an endless toothed belt, wherein the endless toothed belt is guided by means of
a carriage which is driven so as to be displaceable in the transport robot, the displacement of which controls a direction of displacement of the first loading arm, wherein
a loading head is arranged at the outer free end of the loading arm, wherein
a ramp is arranged on the side of the loading head and wherein the toothed belt is guided over a deflecting belt pulley on the loading head, the endless toothed belt disposed on and guided by the deflecting belt pulley at an extent of the endless toothed belt along the direction of displacement of the first loading arm, wherein the front end of the loading head has a supporting roller spaced from the deflecting belt pulley along the direction of displacement of the first loading arm, the supporting roller sized, shaped and positioned to support the loading head in a hollow profile of the storage shelf and a supporting arm bears on a spindle of the belt pulley and the supporting roller is arranged oil the supporting arm, the supporting arm spacing the supporting roller from the deflecting belt pulley and the endless toothed belt along the direction of displacement of the first loading arm.

13. The method according to claim 12, wherein in the lifted, pivotal position of the goods to be transported, a driving of the toothed belt occurs such that the loading arm is guided further under the bottom of the goods to be transported, and in that a relative movement of the upper portion of the toothed belt and the bottom surface of the goods to be transported is blocked thereby.

14. The method according to claim 13, wherein the endless toothed belt comprises two toothed belts arranged parallel to one another, and the carriage synchronizes the two toothed belts to one another.

15. The method according to claim 13, wherein the simple displacement movement of the carriage results in the displacement movement of the loading arm over twice the distance.

16. The method according to claim 12, wherein the endless toothed belt comprises two toothed belts arranged parallel to one another, and the carriage synchronizes the two toothed belts to one another.

17. The method according to claim 12, wherein the simple displacement movement of the carriage results in the displacement movement of the loading arm over twice the distance.

* * * * *